May 23, 1950 G. H. HUBER 2,509,064

REDUCTION OF NOISE IN PULSE POSITION MODULATION SYSTEMS

Filed Aug. 23, 1945 2 Sheets-Sheet 1

INVENTOR
G. H. HUBER
BY George C. Ford
ATTORNEY

May 23, 1950 G. H. HUBER 2,509,064

REDUCTION OF NOISE IN PULSE POSITION MODULATION SYSTEMS

Filed Aug. 23, 1945 2 Sheets-Sheet 2

INVENTOR
G. H. HUBER
BY George C. Ford
ATTORNEY

Patented May 23, 1950 2,509,064

UNITED STATES PATENT OFFICE 2,509,064

REDUCTION OF NOISE IN PULSE POSITION MODULATION SYSTEMS

George H. Huber, Manhasset, N. Y., assignor to Bell Telephone Laboratories, Incorporated, New York, N. Y., a corporation of New York.

Application August 23, 1945, Serial No. 612,285

3 Claims. (Cl. 179—15)

This invention relates to communication systems of the pulse position or phase modulation type employing synchronizing pulses and particularly to time division multiplex systems employing that type of modulation.

In pulse position modulation systems the time position or phase of uniform pulses recurring at a rate at least twice the highest signal frequency is varied in accordance with the signal to be transmitted. One simple and effective method of deriving the modulating signal at the receiver is to produce pulses recurring at the same rate as the transmitted pulses but, instead of being uniform, varying in length in proportion to the time position modulation of the transmitted pulses instead. Such length modulated pulses contain the signal which may be obtained therefrom by filtering out all the components of the pulses outside the modulating frequency range. This receiving process requires some method of determining the position modulation. Particularly in multiplex systems, it is advantageous to accomplish this step by transmitting a synchronizing pulse in addition to the modulated channel pulses.

Accordingly, for multiplex operation the period corresponding to the recurrence rate of the pulses is divided into a number of equal intervals corresponding to the number of channel pulses and a shorter interval for the synchronizing pulse. In order to separate the synchronizing pulse from the channel pulses it must be given some distinguishing characteristic, for example by being made longer it can be readily separated at the receiver. Thus the output of a multiplex transmitter will comprise recurrent frames of pulses each comprising a relatively long pulse, marking the beginning of each frame, and followed by shorter channel pulses, each occurring in the absence of a modulating signal at the mid-point of its assigned channel period but modulated by the respective signal to vary its position with respect to this normal mid-period time.

Such a pulse position modulation time division multiplex system is described in detail in the copending application of J. O. Edson, Serial No. 559,354, filed October 19, 1944, and the articles in Electronic Industries for December 1945, page 82 and Electronics for September 1946, page 126. In the receiver of that system the marker or synchronizing pulse is readily separated from the channel pulses by virtue of its greater length and is employed to generate gating pulses coincident and coextensive with the respective channel periods. By means of such gating pulses the various channel pulses are separated from each other. After separation, each position modulated channel pulse is converted into a length modulated pulse, in particular lasting from the time of occurrence of the channel pulse until the end of the corresponding gating pulse. These length modulated pulses contain the signal which may be obtained by filtering out all components of the length modulated pulses outside of the modulating frequency range.

It will be observed that in such a system the output in the signal circuit will be dependent upon both the position modulated channel pulse and the marker pulse, since the latter determines the gating pulse. Accordingly any conditions that tend to vary the effective phase of either of these pulses will produce disturbances (noise) in the signal circuit output.

An object of the present invention is to reduce the noise in pulse position modulation systems.

A particular object of the invention is to eliminate the noise produced in such system by variations or jitter in the marker pulse.

In accordance with a feature of the present invention, two channel pulses of a time division multiplex, pulse position modulation system are modulated by the same signal in such a way that the two channel pulses are caused to be displaced in their time positions in opposite directions, i. e. that the modulations are in opposite phase. At the receiver the signal outputs from the two channels are so combined that they add in phase. In this way the effect of any jitter in the marker pulse is eliminated as any noise produced thereby will be balanced out in the common signal output.

These and other objects, features and aspects of the invention may be better understood by reference to the following detailed description in connection with the drawing in which.

Figure 1:
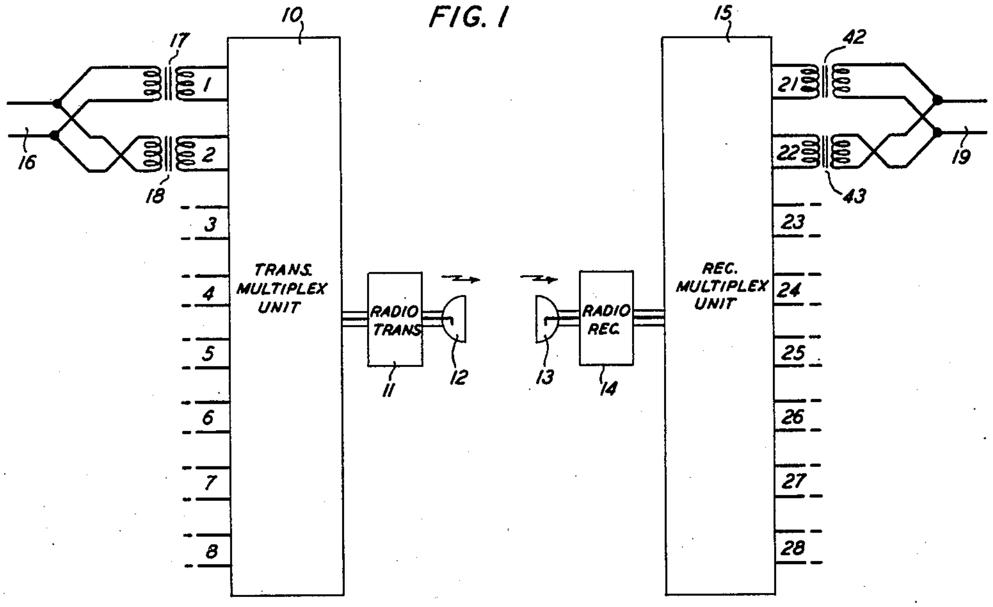
Fig. 1 is a block schematic diagram of a multiplex radio system embodying the present invention.

Fig. 1 shows both terminals of a multiplex radio system operating on the pulse position modulation, time division multiplex basis. The transmitting terminals comprise a transmission multiplex unit 10 with eight audio frequency input circuits 1 to 8, inclusive. The pulse output of this unit is supplied to a radio transmitter 11 to cause the output of trains of super-high frequency oscillations corresponding to the input pulses which are radiated by the directive antenna 12.

At the receiving terminal the radio waves from the antenna 12 are received in the directive antenna 13 and supplied to the radio receiver 14 where they are amplified and detected. The resulting pulse output is supplied to the receiving multiplex unit 15 in which the pulses are selected on a time division basis and converted into signal frequency currents corresponding to the modulating signals supplied at the transmitter and which appear at the signal output terminals 21 to 28, inclusive.

Both the transmitting multiplex unit 10 and the receiving multiplex unit 15 are of the type shown and described in detail in the copending application of J. O. Edson, and the articles previously referred to. Reference is made to that application for the details of these units.

Briefly, the transmitting multiplex operates to produce recurrent frames of pulses each frame comprising a marker pulse followed by channel pulses of shorter duration than the marker pulse and each modulated in time position with respect to a normally assigned position in accordance with the signal for the respective channel. This modulation method may be regarded broadly as a sampling of the instantaneous values of the signal wave at uniform intervals corresponding to the pulse recurrence rate and sending out corresponding pulses in which the values of the sample are represented by the phase or time position of the pulse.

The length of each pulse frame is determined by the pulse recurrence rate. In the system of the Edson application and the articles cited for telephonic communication this is 8,000 cycles per second. The resultant frame period of 125 microseconds is divided into eight channel periods of 15 microseconds each and the extra interval of five microseconds is used for the synchronizing signal, referred to as the marker pulse. The pulse modulator for each channel is so arranged that the pulse occurs at the mid-point of its channel period in the absence of a signal input or when the signal input passes through the zero value at the instant of sampling and is positioned within the limits of that period under the influence of signal inputs of varying amplitudes.

The pulses are derived from a stable frequency oscillator delivering a pulsing output voltage of substantially rectangular wave form of a frequency of 8,000 cycles per second. The square wave output is utilized to control the generation of the marker pulse and the various channel pulses. These latter are supplied to their individual modulators where the time position of each pulse within its assigned channel period in each pulse frame is controlled in accordance with the signal input to the respective channel.

Figure 4:
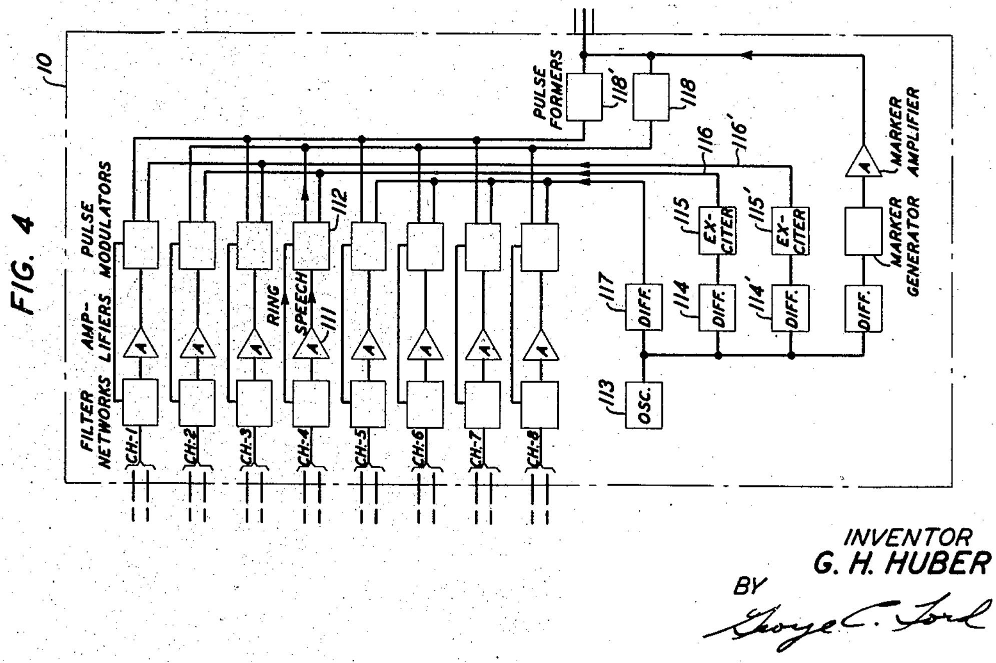
Fig. 4 is a detailed block schematic diagram of the transmitting multiplex unit 10 of Fig. 1.

The transmitting multiplex unit 10 is shown in more detail in Fig. 4. Here the incoming signal lines are shown at the left of the drawing and are designated channels 1 to 8, respectively. The numbering conforms to the time order of the channels in the multiplex cycle. Channel 4 will be taken as representative for the purpose of description. Currents from the incoming line enter a filter 110 which serves to separate the signal currents from low frequency currents used for ringing and also to limit the signal currents to a frequency band extending from about 200 to 3500 cycles per second. The signal currents pass to amplifier 111 and thence to pulse modulator 112 in which they bring about the modulation of the pulse timing. Ringing currents pass directly to the modulator in which they operate to produce a suitable calling signal as will be described later. All of the channels are alike up to this point, the corresponding elements in the other channels appearing at corresponding locations in the drawing.

The modulators receive short impulses at fixed instants in each multiplex period and from these generate length modulated pulses which are timed to end normally at the mid-points of the respective channel periods and which vary in length within the limits of these periods under the influence of the signal currents. The abrupt endings of the length modulated pulses are caused to energize a pulse generating and shaping system in which position modulated pulses of uniform shape and energy are produced and delivered to the common transmission line or medium. Since the pulses occur serially, the shaping system may be shared by all channels in common. However, it is advantageous, for the prevention of interchannel crosstalk to use two shaping networks, one for the odd numbered channels and one for the even numbered channels. The two shaping networks can be matched without difficulty so that the advantage of uniformity of the outgoing pulses is not lost.

The pulses supplied to the modulators are derived from a master oscillator 113 which also furnishes a synchronizing pulse. This oscillator operates at a stable frequency of 8000 cycles per second and is designed to deliver a pulsating output voltage of substantially rectangular wave form. By means of differentiating networks, short pulses alternately positive and negative are produced at the instants the oscillator output voltage changes from one value to the other. The negative pulses are used to time the start of the multiplex cycle and also are supplied to the modulators of channels 1 to 4. The positive pulses are supplied directly to channels 5 to 8. The modulators, by virtue of their circuit design, respond only to positive pulses, consequently the negative pulses must be reversed in sign before being delivered to the lower channel group modulators.

The pulse supply for channel 4 comprises differentiating network 114, exciter 115, in which the signs of the pulses are reversed, and lead 116. These elements also supply pulses to the modulator in channel 2. Similar elements 114′, 115′ and 116′ supply pulses to channels 1 and 3. Pulses are supplied directly to channels 5 to 8 through differentiating network 117. The modulator output voltage in channel 4 is delivered to the pulse former 118, which is shared with the other even numbered channels. A similar pulse former 118′ is provided for the odd numbered channels. From these elements, the modulated pulses pass to radio transmitter.

Figure 2:
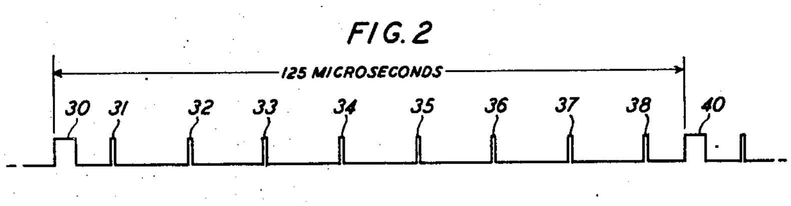
Figs. 2 and 3 are explanatory diagrams illustrating the operation of the invention.

Fig. 2 shows a complete pulse frame comprising a marker pulse 30 and channel pulses 31 to 38, inclusive each of the latter occurring at its mid-channel period as would be the case with no signal input to the respective channel modulators. Pulse 40 is the marker pulse of the next frame.

The pulse output from the transmitter multiplex unit 10 is supplied to the radio transmitter 11. There the radiated pulses of super-high frequency radio waves are most conveniently generated by applying the amplified pulses from the unit 10 to the plate of a super-high frequency oscillator tube thereby energizing the oscillator tube intermittently for the duration of each pulse.

In the receiving multiplex unit 15 the rectified pulse output from the radio receiver 14 is amplified and the marker pulse is separated from the channel pulses by virtue of its greater length. The separated marker pulses are utilized to control the generation of gate pulses that are coincident and coextensive with the respective channel periods. These gate pulses are supplied to respective pulse converters where they are superimposed on the channel pulse inputs. The pulse converters are relaxation circuits that are arranged to be started by positive pulse inputs and are so biased that they can be started only when a gate pulse and a signal pulse are simultaneously present in the input circuit. The converters are also arranged to relax at the end of the gate pulse. As a result they operate to produce pulses that start with the occurrence of the respective channel pulse and continue to the end of the respective gate pulse and accordingly are modulated in length in accordance with the time position of the channel pulse and so also in accordance with the modulating signal at the transmitter.

The final signal output is obtained in each channel by passing the length modulated pulses from the converter through a low-pass filter having a cut-off of about 3,500 cycles per second that accordingly passes the modulating telephone signal while suppressing other components of the pulses.

Figure 5:
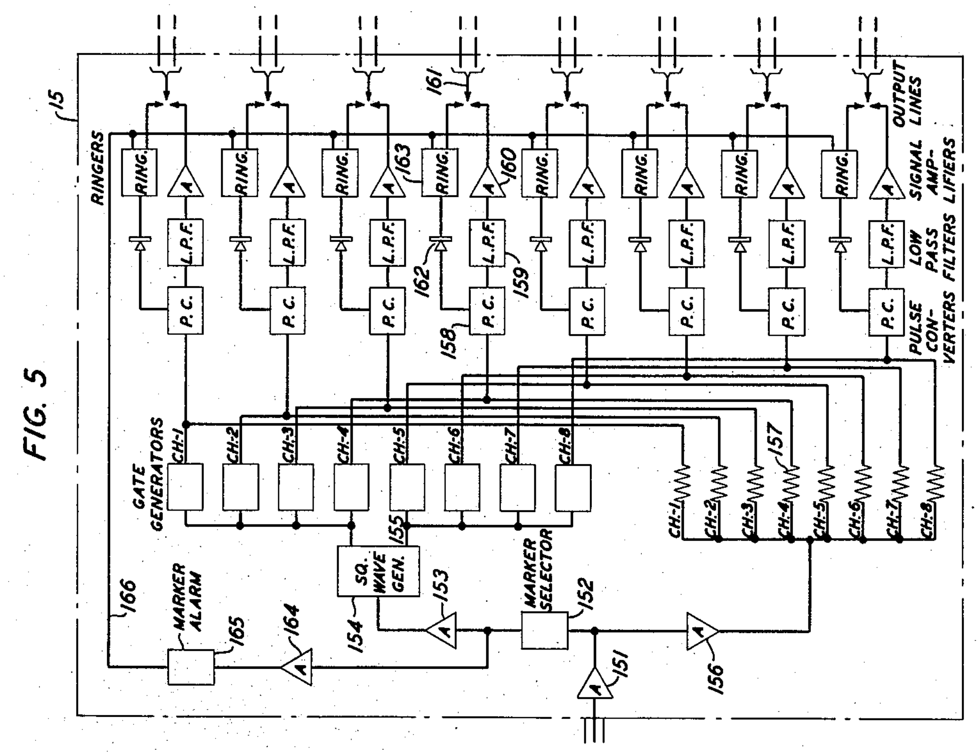
Fig. 5 is a detailed block schematic diagram of the received multiplex unit 15 of Fig. 1.

The schematic arrangement of the receiving multiplex unit is shown in the block diagram, Fig. 5. High frequency pulse trains received by the radio receiver are rectified and the rectified pulses after suitable amplification are delivered to common amplifier 151 which forms the input stage of the multiplex equipment. At the output side of amplifier 151 the circuit divides. One branch goes to a second amplifier 156 and thence to eight different channel conductors through high resistances such as 157 leading to individual pulse converters such as 158. While the conductors are marked in the drawing with their respective channel numbers and the pulse converters are individual to the respective channels, it will be understood that all pulses appear in each channel at this point. The second branch goes to marker selector 152 in which the synchronizing pulses are separated from the channel pulses by virtue of their greater length and are passed on to amplifier 153 and thence to a square wave generator 154.

The square wave generator is a simple multivibrator type of oscillator, the oscillations of which are controlled and synchronized by the amplified marker pulses. Its wave form is nearly symmetrical, dividing the period into two almost equal parts. Pulses derived from the square wave are used to start a series of gate pulse generators such as 155, the purpose of these generators being to provide voltage pulses rectangular in form and coincident and about coextensive with their respective channel periods. The output circuits of the gate generators are connected to the corresponding signal pulse circuits branching from amplifier 156 so that the gate pulses are superimposed on the signal pulses at the inputs of the several pulse converters.

The pulse converters, such as 158, are relaxation circuits similar to those used in the channel modulators of the transmitter. They are arranged to be started by positive pulses and are so biased that they can be started only when a gate pulse and a signal pulse are present simultaneously in their input circuits. They are also arranged to relax at the end of the gate pulse. Consequently they operate to produce pulses which start with the occurrence of the appropriate signal pulses and stop at the end of the gate pulses and are therefore modulated in length according to the signal.

The signal is finally recovered by passing the length modulated pulses through low-pass filters, such as filter 159, which cut off at about 3500 cycles per second, and then through a signal amplifier 160 to the output line 161.

A second output circuit of the pulse converter delivers the converted pulses to a rectifier 162, the rectified output of which is supplied to a ringing relay circuit 163. So long as signal pulses are present the ringing circuit is held inoperative, but on the disappearance of these pulses it operates and sends an appropriate ringing signal over the outgoing line. The switching of the outgoing line is indicated in a conventional manner.

It is desirable to indicate failure to receive the marker pulses, since such failure would usually signify a breakdown at some point in the system. For this purpose the marker pulses from the output of the marker selector are supplied through a separate amplifier 164 to a marker alarm circuit 165. The absence of pulses results in the operation of the alarm circuit to display a suitable warning signal. At the same time the ringing circuits of the several channels are disabled by an interlocking connection through lead 166 so that failure of the marker pulses will not give rise to false calling signals in the connected circuits.

Since the length modulated pulses in the output of the pulse converters are determined not only by the channel pulse but also by the gate pulse that is in turn determined by the marker pulse, any variation or jitter in the marker pulse will produce a corresponding variation in the length modulated pulses that will be reflected in the signal output as noise.

In accordance with this invention, this effect is avoided by the proper use of two channels for transmitting a single signal. Thus, voice currents from the telephone line 16 are supplied to the signal inputs 1 and 2 through the audio transformers 17 and 18. The connections to the primary of transformer 18 are reversed with respect to those to the primary of transformer 17 so that the audio currents will be supplied in opposite phase to the pulse modulators of the respective channels.

Figure 3:
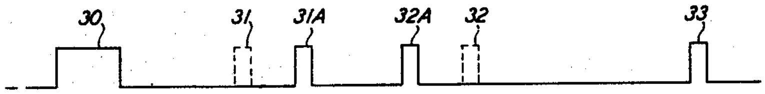

The effect of this circuit connection can be readily understood by reference to Fig. 3. This figure shows to an enlarged scale a portion of the pulse frame of Fig. 2. Herein the channel pulses 31 and 32 in their normal or zero signal position are shown dotted. Assuming that at the sampling instant under consideration the signal current in line 16 is positive, then the channel pulse 31A in channel No. 1 will appear at a later time with respect to the marker pulse 30 than for the mid-position pulse 31, the distance from the mid-position being proportional to the signal amplitude. However, because of the reversed connection to the transformer 18 the positive signal current in the line 16 will appear as a negative current at the modulator of channel No. 2. Accordingly the pulse 32A for that channel will appear earlier than the mid-position pulse 32 and by the same amount as the pulse 31A was later than its mid-position.

At the receiving terminal the voice frequency outputs at terminals 21 and 22 of channels Nos. 1 and 2 are combined in the telephone line 19. The output from channel No. 1 is coupled directly to line 19 through the audio transformer 42 while the output of channel No. 2 is reversed in phase by means of the connections to audio transformer 43. Accordingly the audio frequency outputs of the two channels representative of the modulating signals applied thereto from the line 16 at the transmitter will add in phase in the line 19. On the other hand, any audio frequency noise components representative of variations or jitter in the marker pulse will add in opposite phase and accordingly cancel out in the line 19. (Of course, other types of noise, the effect of which is to vary the time position of the channel pulses in the same direction as they are varied by the signal will not be eliminated by the system of this invention.)

Other signal frequency terminals 3 to 8 of the receiving multiplex unit 15 are not shown connected to any signal lines. However, they may be paired off and connected in a similar way to transmitter terminals 1 and 2 and receiver terminals 21 and 22. On the other hand, under conditions where a multiplicity of channels rather than freedom from noise is controlling some channels may be used individually for signal paths while others are paired to give noise reduction in any combination required. When for noise reduction purpose two channels are paired, it is preferable to use adjacent channels as herein shown; however, it may sometimes be found more convenient to use non-adjacent channels.

What is claimed is:

1. The method of telephony which comprises producing successive frames of pulses each frame comprising an initial pulse of relatively long duration and a succession of short uniform signal pulses following at normally equal time intervals, the frames of pulses recurring at a rate substantially higher than the highest speech frequency to be transmitted, modulating the time position of one of said signal pulses in one sense by signals of one phase, modulating the time position of another of said signal pulses in the sense opposite to that of said one signal pulse by the same signals of the same phase, receiving the pulses after transmission through a common medium, separating the longer initial pulses, producing therefrom a plurality of gating pulses at successive times corresponding to the several signal pulse periods, combining in like phase the received signal pulses with the respective corresponding gate pulses to separate and detect the signal modulations of the signal pulses, and combining the signal modulation outputs of said one of said signal pulses with that of said other of said pulses.

2. In a time division multiplex system, means for producing for each multiplex frame a marker pulse and a plurality of channel pulses and for modulating the channel pulses in time position with respect to the marker pulse in accordance with the respective signal, means at the receiver for producing for each channel a pulse modulated in length in proportion to the position of the respective channel pulse with respect to the marker pulse, a source of signals, connections for supplying signals from said source in such phase as to modulate the pulse of one channel in its position with respect to the marker pulse in one sense for signal variations in one direction, connections for supplying signals from said source in such phase as to modulate the pulse of another channel for signal variations in said one direction in its position with respect to the marker pulse in the sense opposite to the modulation of the pulse of said one channel, a signal output circuit, and connections for supplying the signal outputs of said two channels to said output circuit so that the signals add in like phase.

3. In a time division multiplex system, means for producing recurrent frames of pulses, each frame comprising at least one synchronizing pulse and a succession of channel pulses following at normally equal time intervals, means for modulating said channel pulses by signals to vary their time position with respect to the normal time position in accordance with the signals, receiving means for deriving the modulating signals from the received pulses by the production of length modulated pulses determined by the relative position of the channel and synchronizing pulses, a source of signals, means for modulating the pulse of one channel in its time position with respect to the normal time position in one sense in accordance with signals of one phase from said source, means for modulating the pulse of another channel in its time position with respect to the normal time position in the sense opposite to the modulation of the pulse of said one channel in accordance with signals of said one phase from said source, and means for so combining the signal outputs of said two channels from said receiving means that the signals add in phase.

GEORGE H. HUBER.

REFERENCES CITED

The following references are of record in the file of this patent:

UNITED STATES PATENTS

| Number | Name | Date |
|---|---|---|
| 2,199,634 | Koch | May 7, 1940 |
| 2,379,899 | Hansell | July 10, 1945 |
| 2,403,210 | Butement et al. | July 2, 1946 |
| 2,416,328 | Labin | Feb. 25, 1947 |
| 2,416,329 | Labin et al. | Feb. 25, 1947 |
| 2,426,225 | Krause | Aug. 26, 1947 |
| 2,429,613 | Deloraine | Oct. 28, 1947 |